United States Patent
Lathrop et al.

(10) Patent No.: US 8,874,364 B2
(45) Date of Patent: Oct. 28, 2014

(54) NAVIGATION SYSTEM

(75) Inventors: Brian Lathrop, San Jose, CA (US); Brian Michael Finn, East Palo Alto, CA (US); Jackie Chang, Mountain View, CA (US)

(73) Assignee: Volkswagen AG, Wolfsburg (DE)

( * ) Notice: Subject to any disclaimer, the term of this patent is extended or adjusted under 35 U.S.C. 154(b) by 1150 days.

(21) Appl. No.: 11/890,024

(22) Filed: Aug. 2, 2007

(65) Prior Publication Data

US 2009/0037092 A1 Feb. 5, 2009

(51) Int. Cl.
- *G01C 21/00* (2006.01)
- *G08G 1/0962* (2006.01)
- *G01C 11/02* (2006.01)

(52) U.S. Cl.
CPC ............. *G08G 1/0962* (2013.01); *G01C 11/02* (2013.01)
USPC ............. 701/408; 701/410; 701/23; 701/433; 701/428; 340/990; 340/988; 340/995.1; 340/995.2; 340/903; 345/501; 345/555; 345/1.3; 345/205; 345/206

(58) Field of Classification Search
USPC ................... 701/200, 408, 410, 458, 538, 25; 340/990, 988, 995.1, 995.2, 903; 345/501, 1.3, 205, 206, 440, 536, 537
See application file for complete search history.

(56) References Cited

U.S. PATENT DOCUMENTS

| | | | |
|---|---|---|---|
| 4,974,170 A | | 11/1990 | Bouve et al. |
| 5,343,395 A | * | 8/1994 | Watts ............................. 701/16 |
| 5,436,623 A | * | 7/1995 | Terada et al. ............ 340/995.27 |
| 5,469,740 A | * | 11/1995 | French et al. .............. 73/379.04 |
| 5,748,109 A | * | 5/1998 | Kosaka et al. ........... 340/995.14 |
| 5,798,733 A | * | 8/1998 | Ethridge ................... 342/357.34 |
| 5,845,226 A | * | 12/1998 | Ajima ........................... 701/409 |
| 5,884,218 A | * | 3/1999 | Nimura et al. ................. 701/428 |
| 6,222,583 B1 | * | 4/2001 | Matsumura et al. .......... 348/113 |
| 6,351,710 B1 | * | 2/2002 | Mays ............................ 701/533 |
| 6,415,224 B1 | * | 7/2002 | Wako et al. ................... 701/409 |
| 6,466,865 B1 | | 10/2002 | Petzold |
| 6,594,581 B2 | * | 7/2003 | Matsuda et al. .............. 701/533 |
| 6,710,774 B1 | * | 3/2004 | Kawasaki et al. ............. 345/419 |

(Continued)

FOREIGN PATENT DOCUMENTS

| | | |
|---|---|---|
| DE | 698 15 940 | 6/2004 |
| DE | 10 2005 056047 | 6/2006 |

(Continued)

OTHER PUBLICATIONS

Periodical Autoconnect 2005, Vereinigte Motor-Verlage GmbH & Co. KG (United Motor publishing house, Inc.), Leuschnerstr. 1, 70174 Stuttgart, Federal Republic of Germany, pp. 18 and 21. (translated).

"NavPix", http://www.navman.com/Navman/Templates/productinformation_46258.aspx (May 16, 2007).

"Exchangeable image file format for digital still cameras: Exif Version 2.2", Japan Electronics and Information Technology Industries Association, http://www.kodak.com/global/plugins/acrobat/en/service/digCam/exifStandard2.pdf. (Apr. 2002).

International Search Report, issued in International Application No. PCT/EP2008/006055.

Periodical Autoconnect 2005, Vereinigte Motor-Verlage GmbH & Co. KG (United Motor Publishing House, Inc.), Leuschnerstr. 1, 70174 Stuttgart, Federal Republic of Germany, pp. 18 and 21.

*Primary Examiner* — Redhwan k Mawari

(74) *Attorney, Agent, or Firm* — Kenyon & Kenyon LLP

(57) ABSTRACT

In a navigation system, e.g., for a motor vehicle, for determining the route from a location of the navigation system to a destination point, the navigation system includes a display device for displaying the route in a map display or a map-type display, and/or a direction indication that corresponds to the route, and it is possible to simultaneously display a canonically oriented graphic or image of a prominent route point with the aid of the display device.

18 Claims, 7 Drawing Sheets

(56) References Cited

U.S. PATENT DOCUMENTS

| | | | |
|---|---|---|---|
| 6,810,326 B1* | 10/2004 | Kawasaki | 701/410 |
| 7,039,521 B2* | 5/2006 | Hortner et al. | 701/436 |
| 7,546,188 B2* | 6/2009 | Nezu et al. | 701/36 |
| 7,627,420 B2 | 12/2009 | Ujino | |
| 7,728,869 B2 | 6/2010 | Jung | |
| 2001/0052861 A1* | 12/2001 | Ohmura et al. | 340/988 |
| 2004/0064339 A1* | 4/2004 | Shiota et al. | 705/1 |
| 2004/0098195 A1 | 5/2004 | Listle et al. | |
| 2004/0267443 A1 | 12/2004 | Watanabe | |
| 2005/0096812 A1* | 5/2005 | Nezu et al. | 701/36 |
| 2006/0164412 A1 | 7/2006 | Dupont et al. | |
| 2007/0065002 A1* | 3/2007 | Marzell et al. | 382/154 |
| 2007/0150142 A1 | 6/2007 | Cieler et al. | |
| 2007/0244634 A1 | 10/2007 | Koch et al. | |
| 2009/0037092 A1* | 2/2009 | Lathrop et al. | 701/201 |

FOREIGN PATENT DOCUMENTS

| | | |
|---|---|---|
| EP | 0 875 730 | 11/1998 |
| FR | 2 634 707 | 2/1990 |
| WO | WO 97/18440 | 5/1997 |
| WO | WO 00/30057 | 5/2000 |

* cited by examiner

NAVIGATION SYSTEM

FIELD OF THE INVENTION

The present invention relates to a navigation system, e.g., for a motor vehicle, for determining the route from a location of the navigation system to a destination point.

BACKGROUND INFORMATION

U.S. Patent Application Publication No. 2006/0164412 describes a system for 3D-navigation for motor vehicles, which includes an arrangement combining a first motor vehicle and an environment scanner to generate a three-dimensional image of an environment of the first motor vehicle or at least a part of the environment of the first motor vehicle, as well as at least one second motor vehicle and a communications connection between the first motor vehicle and the second motor vehicle for transmitting to the second motor vehicle the three-dimensional image of the environment around the first motor vehicle or at least a part of the environment around the first motor vehicle.

European Published Patent Application No. 0 875 730 and German Published Patent Application No. 698 15 940 describe a map information display device for use in a vehicle navigation device having a data conversion device for recording points of map data according to a map from a viewpoint through a viewing line that originates from the viewpoint and has an angle of depression with respect to the plane of the map, and for perspectively projecting the points of the map data onto a viewing plane, which is fixed perpendicular to the viewing line and is a predefined distance from the viewpoint in order to generate map display data. This produces a bird's eye view of a surrounding area. A navigation system having a bird's eye view of an environment is also described in French Published Patent Application No. 2 634 707 as well as the document "autoconnect 2005," Vereinigte Motor-Verlage GmbH & Co. K G, Leuschnerstr. 1, 70174 Stuttgart, Germany, pages 18 and 21.

SUMMARY

Example embodiments of the present invention may improve the operability of a navigation system. Example embodiments of the present invention may facilitate the operation of a navigation system.

In a navigation system, e.g., for a motor vehicle, for determining the route from a location of the navigation system to a destination point, the navigation system includes a display device for displaying or representing the route in a map display or a map-type display and/or a direction indication that corresponds to the route, and it is possible to simultaneously display a canonically oriented graphic or image of a prominent route point with the aid of the display device.

A map-type display may be, for example, a map display in a bird's eye view, or a satellite image, e.g., also in a bird's eye view. A canonically oriented graphic or image may include a graphic or image from the perspective of a driver of a motor vehicle.

A prominent route point may be a destination point, a point of interest (POI), a feature along the route that is particularly easy to recognize, a point at which a change of direction is to be made, a point to which the driver is to pay special attention for some other reason, etc.

A canonically oriented graphic or image of a prominent route point is not a moving image, such as a film, for example, but may be a fixed, static or quasi-static image. Although it may be replaced by another canonically oriented graphic or image of a prominent route point, it should be clear to the viewer, e.g., that no moving image is displayed but that a static image is being replaced by another static image. The graphic or image may be stored in formats such as JPEG, BITMAP, TIFF, TARGA, GIFF, PNG and/or EPS, etc.

It may be provided that canonically oriented graphics or images of more than one prominent route point are displayed. For example, a canonically oriented graphic or image of a first prominent route point as well as a canonically oriented graphic or image of a second prominent route point may be shown simultaneously. In this instance, the displays may relate to two consecutive prominent route points or to the next prominent route point and a destination point. It may be provided that at least one canonically oriented graphic or image of a prominent route point is always displayed. However, it is also possible that a canonically oriented graphic or image of a prominent route point is shown only if it will be reached within a specified time and/or distance.

Suitable canonically oriented graphics or images may be obtained, for example, as Amazon's A9 Map Service or Microsoft's Virtual Earth. In this instance, a data base including canonically oriented graphics and images may be imported into the navigation system. However, it is also possible to import individual geocoded images from other traffic participants or image exchanges in a geocoded manner. Geocoded should be understood to mean, e.g., that the graphic or image is assigned the coordinates of a point on the earth, for example, in a table or as illustrated in FIG. 2, for example. The graphic in FIG. 2 is assigned the coordinates 37°, 53 minutes, 46 seconds northern latitude as well as 122°, 16 minutes, 9 seconds western latitude.

Geographic information such as a geocoding, may be assigned to a graphic or image. Image data of a graphic or image together with a geocoding may be stored in a data file. Image data of a graphic or image together with a geocoding may be stored in a data file in EXIF format.

The navigation system may be assigned a camera for recording an image of an environment of the motor vehicle, and a device for creating a data file including the image and a geocoding that corresponds to the location of the navigation system or motor vehicle.

It may be possible to display graphics or images of selectable destination points for the input of a destination point. If the selection of graphics or images is greater than displayable simultaneously, then scrolling through the graphics or images may be provided. The graphics or images may be displayable sorted by categories. Categories may be, for example, hotels, restaurants, monuments, etc., or similar things. However, categories may also be transmitters or authors of particular graphics or images.

Furthermore, in a method for operating a navigation system which includes one or a plurality of the aforementioned features, e.g., a navigation system for a motor vehicle, for determining the route from a location of the navigation system to a destination point, the route is represented in a map display or a map-type display and/or a direction indication that corresponds to the route, and a canonically oriented graphic or image of a prominent route point is shown simultaneously. A motor vehicle may be, e.g., a land vehicle that may be used individually on the roads. Motor vehicles are specifically not limited to land vehicles having an internal combustion engine.

According to an example embodiment of the present invention, a navigation system for determining a route from a location of the navigation system to a destination point includes: a display device configured to display at least one of (a) the route in at least one of (i) a map display and (ii) a map-type display and (b) a direction indication that corresponds to the route, the display device configured to simultaneously display a canonically oriented image of a prominent route point.

The image may include geographic information.

The navigation system may be configured to store image data of the image together with a geocode in a data file.

The navigation system may be configured to store image data of the image together with a geocode in a data file in EXIF format.

According to an example embodiment of the present invention, a motor vehicle includes a navigation system having one or more of the features described herein.

The motor vehicle may include: a camera configured to record an image of an environment of the motor vehicle; and a device configured to create a data file including the image and a geocode that corresponds to the location of the motor vehicle.

According to an example embodiment of the present invention, a method for operating a navigation system includes: inputting a destination point; determining a route from a location of the navigation system to the input destination point; displaying at least one of (a) the route in at least one of (i) a map display and (ii) a map-type display and (b) a direction indication that corresponds to the route; and simultaneous displaying a canonically oriented image of a prominent route point.

The image may include geographic information.

Further features and aspects of example embodiments of the present invention are described in more detail below with reference to the appended Figures.

DETAILED DESCRIPTION

Figure 1:
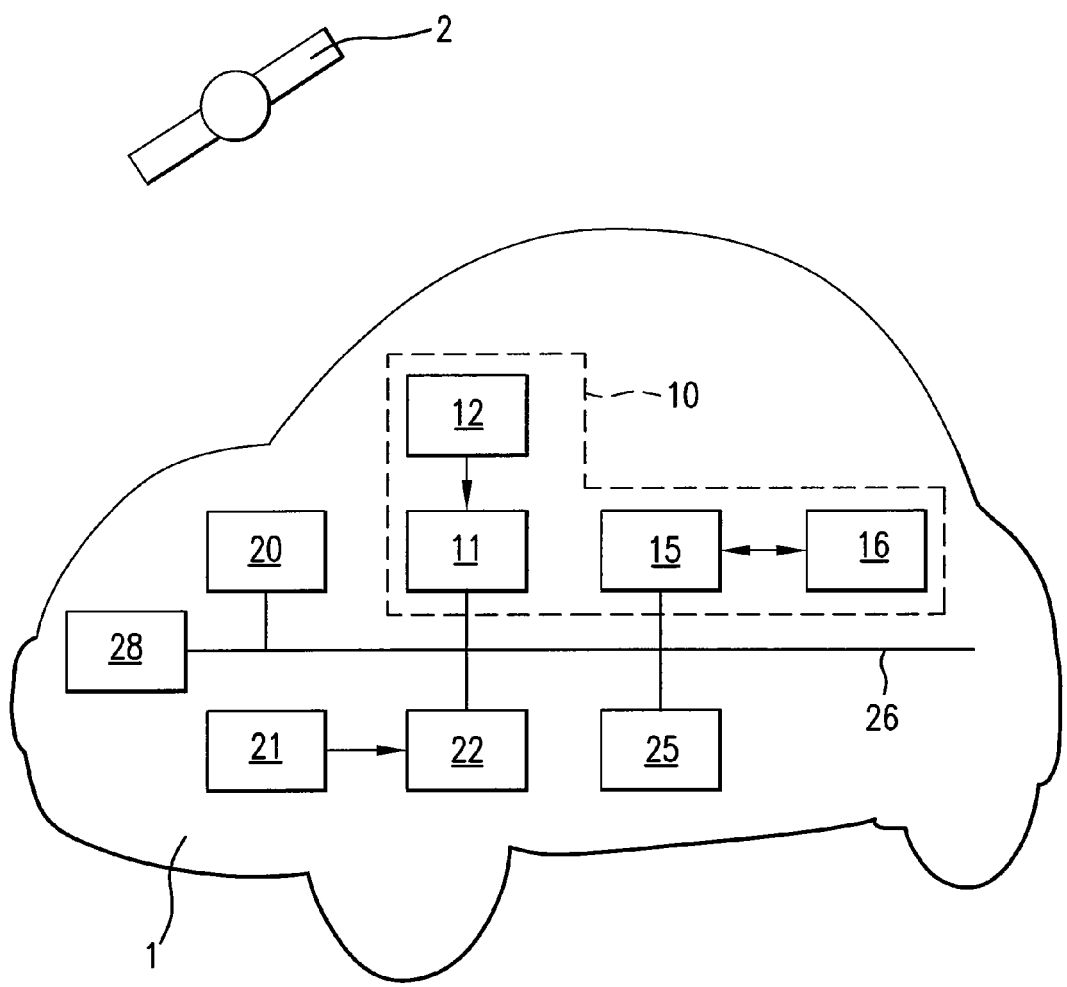
FIG. 1 schematically illustrates an exemplary embodiment of a motor vehicle.

FIG. 1 schematically illustrates an exemplary embodiment of a motor vehicle 1. Motor vehicle 1 includes a display and operating device 16 as well as a display and operating control 15 to control display and operating device 16. Motor vehicle 1 also includes a navigation module 11, which is connected to an antenna 12 for receiving items of location information (such as GPS, Dead Reckoning (DR), etc.) transmitted from satellite 2. Navigation module 11 is connected to display and operating control 15 via a bus system 26. Antenna 12 and navigation module 11 in conjunction with display and operating control 15 as well as display and operating device 16 form a navigation system 10.

Figure 2:
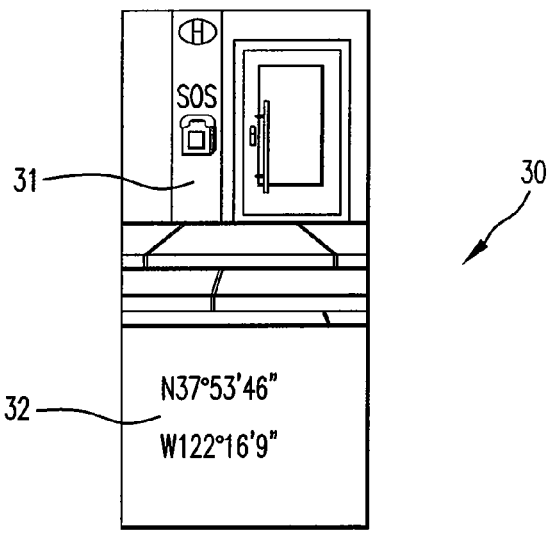
FIG. 2 schematically illustrates an exemplary embodiment of a geocoded image data file.
Figure 3:
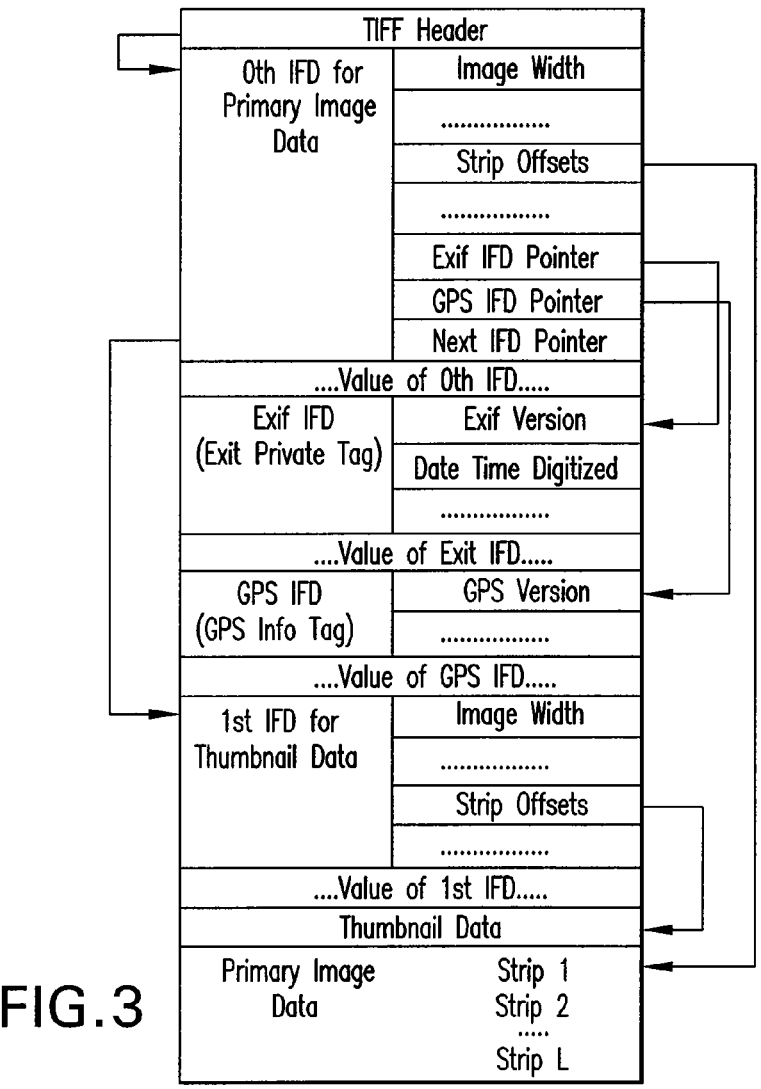
FIG. 3 schematically illustrates an exemplary embodiment of a geocoded image data file.

Motor vehicle 1 includes an image-transmission interface 20, by which graphics or images together with geographic information assigned thereto, such as geocoded image data files as illustrated in FIG. 2 and FIG. 3 by way of example, may be read in. Image-transmission interface 20 may be, or include, an SD reader, for example. As an alternative or in addition, image-transmission interface 20 may be arranged as a compact flash memory reader, a DVD reader, a vCD reader, a USB interface, a Wi-Fi interface, a Bluetooth interface, a cellular phone interface, etc. Image-transmission interface 20 may be connected to navigation module 11 via bus system 26. However, it is also possible for image-transmission interface 20 to be connected to navigation module 11 for a data link in an alternate manner and/or to be part of navigation system 10. Additional modules 25 such as a climate-control system, a telephone, an infotainment system, etc., or similar device may be connected to bus system 26.

FIG. 2 schematically illustrates an exemplary embodiment of a geocoded image data file 30. Image data file 30 includes a graphic or image 31 as well as a geocoding 32. In the illustrated exemplary embodiment, the geocoding includes the entry 37°, 53 minutes, 46 seconds northern latitude and 122°, 16 minutes, 9 seconds western longitude. Such a data file may be stored in EXIF format (EXchangeable Image File), as illustrated in FIG. 3. In this format the graphic or image components, for example, are stored in JPEG format.

Figure 4:
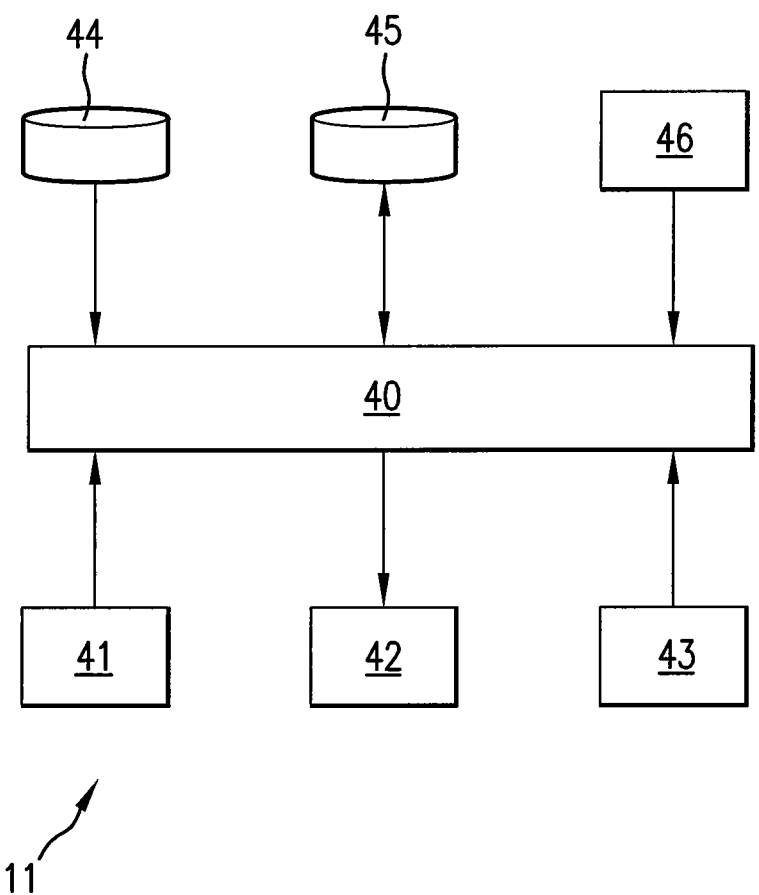
FIG. 4 schematically illustrates an exemplary embodiment of a navigation module.

FIG. 4 illustrates an exemplary embodiment of navigation module 11. Navigation module 11 includes a navigation algorithm 40 for determining the location of motor vehicle 1 as a function of the signals received from antenna 12 or as a function of items of information that are read in via an interface 46, and for determining a route from this location to an input destination point. Navigation algorithm 40 accesses a route atlas 44 for this purpose. Inputs into navigation algorithm 40 are made via an interface 41, and outputs via an interface 42. Furthermore, an interface 43 (such as EXIF tag parser API) is provided to read in geocoded image data files, for example. The possibly geocoded image data files read in in this manner may be stored in a memory 45, for example. Memory 45 may also be a DVD or a hard drive of navigation module 11 or navigation system 10.

Figure 5:
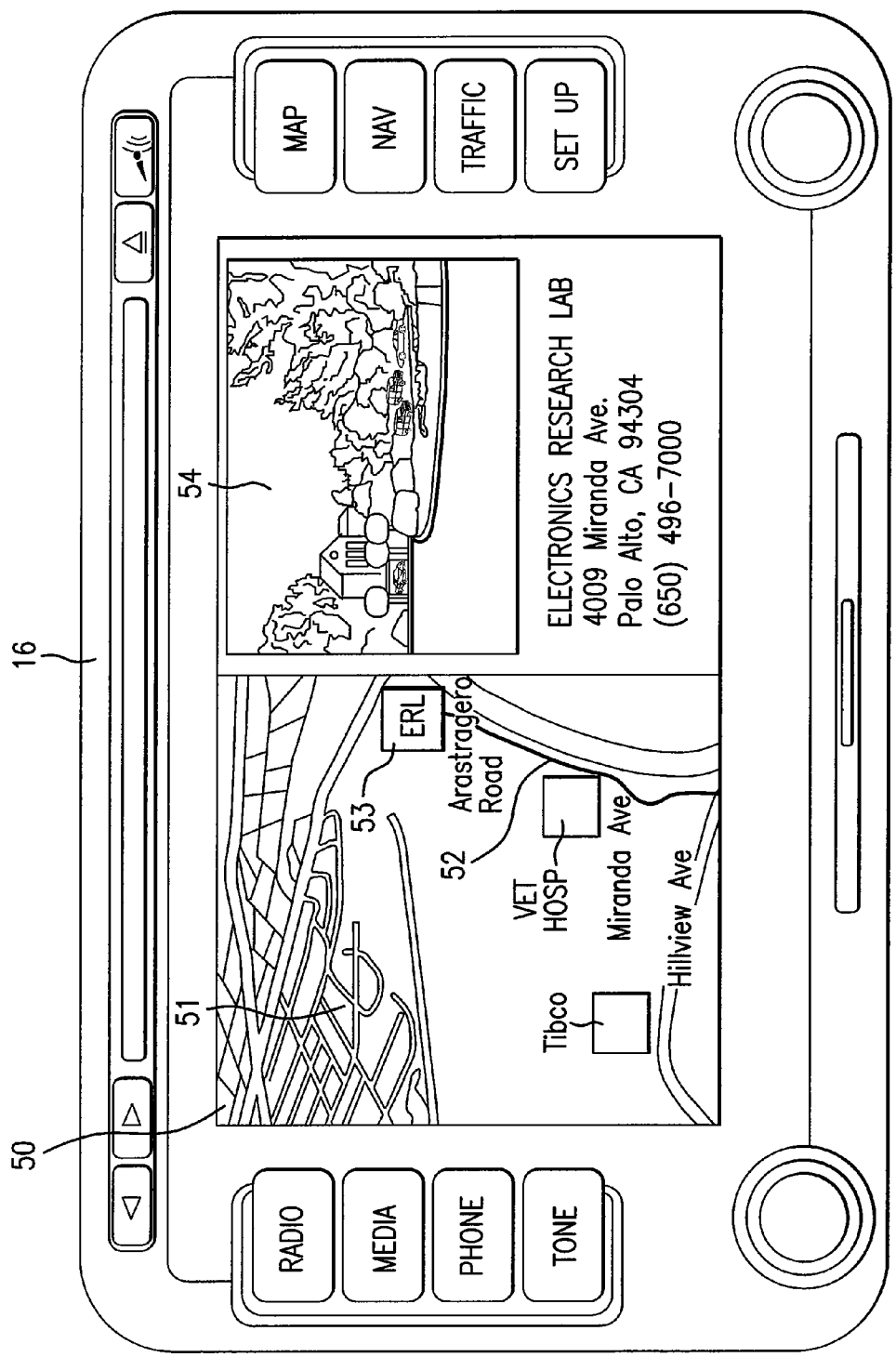
FIG. 5 schematically illustrates a display and operating device.

The method of functioning of navigation module 11 or navigation system 10 is described with reference to FIG. 5. FIG. 5 illustrates display and operating device 16. In addition to operating elements such as push-button switches and rotary knobs, display and operating device 16 includes a display 50 above which a touch screen may possibly be arranged. In the scenario depicted, a map display 51 is shown on the left side of display 50 in a bird's eye view. This map display shows destination point 53 as well as route 52 to destination point 53. On the right side of display 50, a canonically oriented graphic or image 54 of destination point 53 is shown. Furthermore, destination point 53 is described underneath it with the aid of alphanumerical characters.

Figure 6:
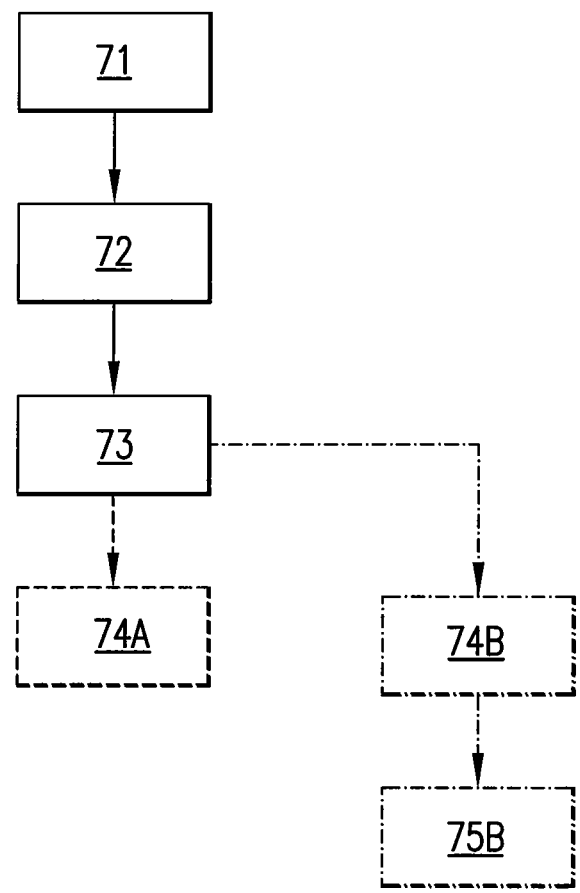
FIG. 6 illustrates an exemplary embodiment of a method for operating a navigation system.
Figure 7:
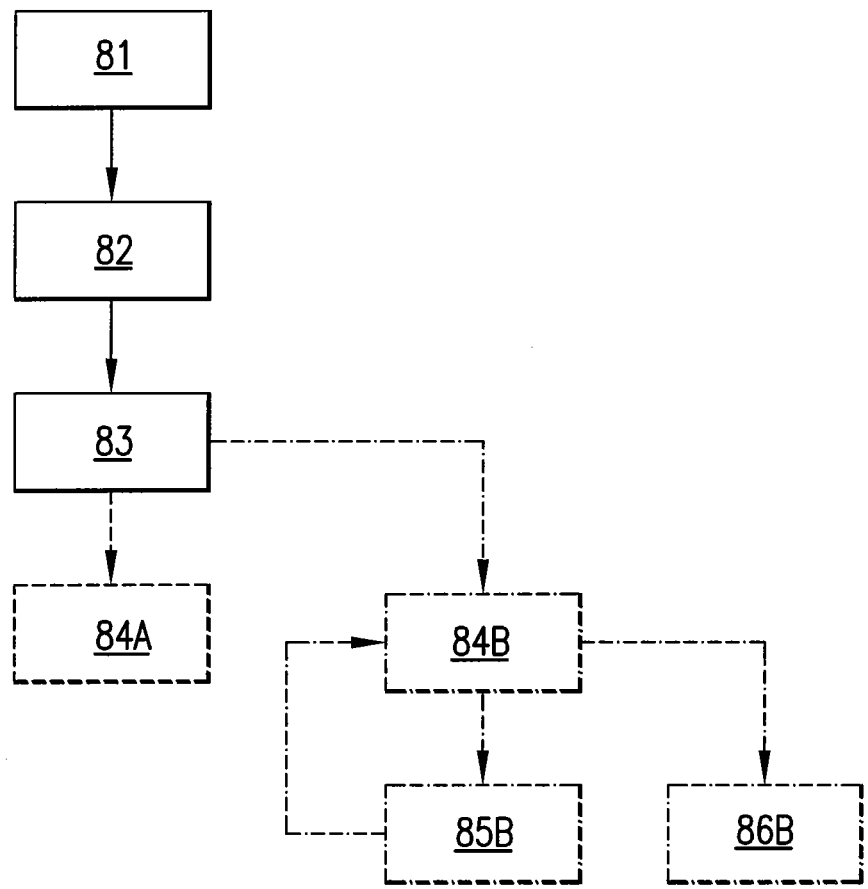
FIG. 7 illustrates an exemplary embodiment of a method for operating a navigation system.

In the following text, exemplary (not all-inclusive) use or operating scenarios with regard to navigation system 10 or motor vehicle 1 are described with reference to FIGS. 6 to 8.

1. A user inputs a destination point into the destination-input menu of navigation system 10 (cf. step 71 in FIG. 6). After the destination has been input, navigation algorithm 40 or a corresponding processor calculates a route from the user's location to the destination point (cf. step 72 in FIG. 6). Following this calculation of the route, navigation algorithm 40 or a corresponding processor correlates the geo-specific coordinates of the destination point with the geo-specific coordinates of a canonically oriented graphic or image in memory 45 or in the RAM (cf. step 73 in FIG. 6). Afterward, the calculated route and the canonically oriented graphic or image of the destination point are displayed to the operator (cf. step 74A in FIG. 6). As an alternative, the calculated route is displayed to the operator (cf. step 74B in FIG. 6). If a specified distance from the destination point has been reached, the canonically oriented graphic of image of the destination point will be shown to the operator simultaneously with the route (cf. step 75B in FIG. 6).

2. An operator inputs into the destination-input menu of navigation system 10 a destination point and POIs lying in between (cf. step 81 in FIG. 7). Following the input of the destination point and input of the POI(s), navigation algorithm 40 or a corresponding processor calculates a route from the location of the user to the destination point, e.g., such that the route extends along the POI(s) (cf. step 82 in FIG. 7). Following this calculation of the route of the user, navigation algorithm 40 or a corresponding processor correlates the destination point and the POI(s) with the geo-specific coordinates of the canonically oriented graphics or images to the extent that they are available in memory 45 or a corresponding RAM (cf. step 83 in FIG. 7). The calculated route and the canonically oriented graphics or images of the destination point and the POI(s) are displayed together (cf. step 84A in FIG. 7). As an alternative, the calculated route may be displayed to the operator (cf. step 84B in FIG. 7). To this end, it is also provided that a canonically oriented graphic or image of the particular POI(s) is displayed that lie(s) within a specified distance (cf. step 85B in FIG. 7). After passing the POI(s), the route is shown by itself again (cf. step 84B in FIG. 7). If a specified distance to the destination point has been reached, the canonically oriented graphic or image of the destination point is displayed in addition to the calculated route (cf. step 86B in FIG. 7).

3. An operator inputs a destination point into a destination-input menu of navigation system 10 (cf. step 91 in FIG. 8). After the destination point has been input, navigation algorithm 40 or a corresponding processor calculates the route from the user's location to the destination point (cf. step 92 in FIG. 8). Following the calculation of the route, navigation algorithm 40 or a corresponding processor correlates the geo-specific coordinates of the destination point with the geo-specific coordinates that are assigned to different canonically oriented images in memory 44 or a corresponding RAM (cf. step 93 in FIG. 8). In addition, navigation algorithm 40 or a corresponding processor correlates the geo-specific coordinates of locations along the route at which changes in directions have to be made, with geo-specific coordinates that are assigned to the canonically oriented graphics or images of these locations stored in memory 44 or a corresponding RAM (cf. step 94 in FIG. 8).

Figure 8:
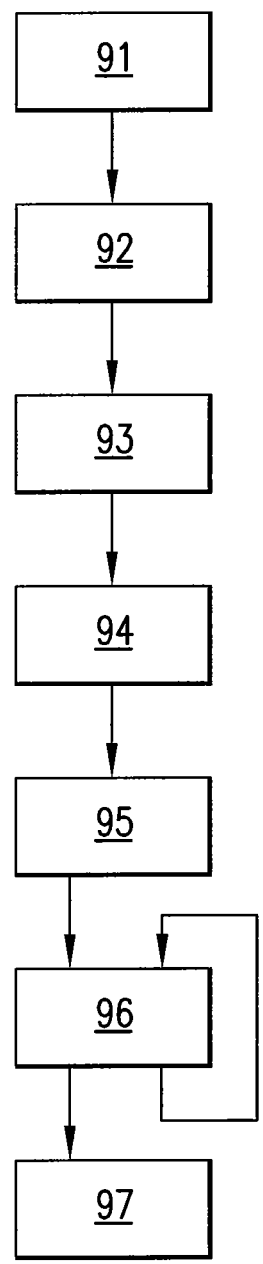
FIG. 8 illustrates exemplary embodiment of a method for operating a navigation system.

The calculated route will be indicated to the operator (cf. step 95 in FIG. 8). When reaching a location at which a change in direction must be made, the canonically oriented graphic or image of this location is displayed in addition (cf. step 96 in FIG. 8). After passing all locations at which a change in direction is to be made, the calculated route is shown by itself again. When a specified distance to the destination point is reached, the canonically oriented graphic or image of the destination point will be shown together with the route (cf. step 97 in FIG. 8).

Optionally, motor vehicle 1, as illustrated in FIG. 1, includes a camera 21 to record an image of the environment of motor vehicle 1, and a geocoder 22 by which a graphic or image recorded by camera 21 is coded by a geocoding. To this end, geocoder 22 receives the coordinates of the location of motor vehicle 1 or navigation system 10 from navigation module 11. An image data file generated by geocoder 22 is able to be read into navigation module 11. As an alternative or in addition, the geocoded image data file may be transmitted to a stationary device and/or another motor vehicle via a communication interface 28.

LIST OF REFERENCE CHARACTERS

1 motor vehicle
2 satellite
10 navigation system
11 navigation module
12 antenna
15 display and operating control
16 display and operating device
20 image-transmission interface
21 camera
22 geocoder
25 additional modules
26 bus system
28 communication interface
30 image data file
31, 54 graphic or image
32 geocoding
40 navigation algorithm
41, 42, 43, 46 interface
44 route atlas
45 memory
50 display
51 map display
52 route
53 destination point
71, 72, 73, 74A
74B, 75B, 81
82, 83, 84A, 84B,
85B, 86B, 91, 92,
93, 94, 95, 96,
97 step

What is claimed is:

1. A navigation system for determining a route from a location of the navigation system to a destination point, comprising:
 a processor configured to correlate a geocode of the destination point with a geocode of a canonically oriented static photographic image of a prominent route point, wherein the geocode of the image is stored along with image data of the image in a data file; and
 a display device configured to display at least one of (a) the route in at least one of (i) a map display and (ii) a map-type display and (b) a direction indication that corresponds to the route, the display device configured to simultaneously display the canonically oriented static photographic image of a prominent route point,
 wherein the canonically oriented static photographic image of the prominent route point is shown only within at least one of a specified time or distance from the prominent route point and prior to the prominent route point.

2. The navigation system according to claim 1, wherein the image includes geographic information.

3. The navigation system according to claim 1, wherein the data file is in EXIF format.

4. The navigation system according to claim 1, wherein the navigation system is adapted to perform a method including:
 inputting the destination point;
 determining the route from the location of the navigation system to the input destination point;

displaying at least one of (a) the route in at least one of (i) the map display and (ii) the map-type display and (b) the direction indication that corresponds to the route; and simultaneous displaying the canonically oriented static photographic image of the prominent route point.

5. The motor vehicle according to claim 1, wherein the photographic image is an actual depiction of the prominent route point.

6. The motor vehicle according to claim 1, wherein the photographic image allows the user to ascertain the actual appearance of the prominent route point.

7. The motor vehicle according to claim 1, wherein the at least one of (i) the map display and (ii) the map-type display is arranged on the left side of the display device, and the canonically oriented photographic image is arranged on the right side of the display device.

8. The navigation system according to claim 1, wherein the display device is adapted to replace the canonically oriented static photographic with another canonically oriented static photographic image without user input.

9. A motor vehicle, comprising:
   a navigation system configured to determine a route from a location of the navigation system to a destination point, the navigation system including:
      a processor configured to correlate a geocode of the destination point with a geocode of a canonically oriented static photographic image of a prominent route point, wherein the geocode of the image is stored along with image data of the image in a data file; and
      a display device configured to display at least one of (a) the route in at least one of (i) a map display and (ii) a map-type display and (b) a direction indication that corresponds to the route, the display device configured to simultaneously display the canonically oriented static photographic image of a prominent route point,
      wherein the canonically oriented static photographic image of the prominent route point is shown only within at least one of a specified time or distance from the prominent route point and prior to the prominent route point.

10. The motor vehicle according to claim 9, wherein the image includes geographic information.

11. The motor vehicle according to claim 9, wherein the data file is in EXIF format.

12. The motor vehicle according to claim 9, further comprising:
   a camera configured to record an image of an environment of the motor vehicle; and
   wherein the data file is created by a device and the geocode corresponds to a location of the motor vehicle.

13. The motor vehicle according to claim 9, wherein the navigation system is adapted to perform a method including:
   inputting the destination point;
   determining the route from the location of the navigation system to the input destination point;
   displaying at least one of (a) the route in at least one of (i) the map display and (ii) the map-type display and (b) the direction indication that corresponds to the route; and
   simultaneous displaying the canonically oriented static photographic image of the prominent route point.

14. The motor vehicle according to claim 9, wherein the display device is adapted to replace the canonically oriented static photographic with another canonically oriented static photographic image without user input.

15. A method for operating a navigation system, comprising:
   inputting a destination point;
   determining a route from a location of the navigation system to the input destination point;
   correlating a geocode of the destination point with a aeocode of a canonically oriented static photographic image of a prominent route point, wherein the geocode of the image is stored along with image data of the image in a data file; and
   displaying at least one of (a) the route in at least one of (i) a map display and (ii) a map-type display and (b) a direction indication that corresponds to the route; and
   simultaneous displaying a canonically oriented static photographic image of a prominent route point and prior to the prominent route point.

16. The method according to claim 15, wherein the image includes geographic information.

17. The method according to claim 15, wherein the navigation system is included in a motor vehicle.

18. The method according to claim 15, further comprising replacing the canonically oriented static photographic image with another canonically oriented static photographic image without further input.

* * * * *